United States Patent [19]

Pellenc

[11] Patent Number: 5,002,135
[45] Date of Patent: Mar. 26, 1991

[54] PORTABLE ELECTRIC TOOL

[75] Inventor: Roger J. P. Pellenc, Pertius, France

[73] Assignee: Etablissements Pellenc et Motte (S.A.), Pertius, France

[21] Appl. No.: 378,495

[22] Filed: Jul. 11, 1989

Related U.S. Application Data

[63] Continuation of Ser. No. 187,176, Apr. 28, 1988, abandoned.

[30] Foreign Application Priority Data

Apr. 28, 1987 [FR] France .................... 87 06141

[51] Int. Cl.$^5$ ................................ B25F 5/00
[52] U.S. Cl. .................................. 173/170; 30/228; 30/180
[58] Field of Search .............. 30/228, 210, 180; 173/170

[56] References Cited

U.S. PATENT DOCUMENTS

| | | | |
|---|---|---|---|
| 2,942,507 | 6/1960 | Fischer et al. | 30/228 |
| 3,386,298 | 6/1968 | Klingler | 173/170 |
| 3,403,738 | 10/1968 | Burkhart et al. | 173/170 |
| 4,109,381 | 8/1978 | Pellenc | 30/228 |
| 4,208,792 | 6/1980 | Ewig, Jr. | 30/228 |
| 4,359,821 | 11/1982 | Pellenc | 30/228 |
| 4,747,212 | 5/1988 | Cavdek | 30/228 |

Primary Examiner—Frank T. Yost
Assistant Examiner—Scott A. Smith
Attorney, Agent, or Firm—William A. Drucker

[57] ABSTRACT

A portable electric tool, such as, for example, shears or secateurs suitable for pruning and/or harvesting work, comprises at least one moving working component disposed at the front and of a hollow frame one part of which forms the handle of the tool and inside which are housed an electric motor and a speed reducer. The outlet of the speed reducer is connected to the moving working component by means of a transmission system which comprises a moving gear unit. The tool also includes a trigger which protrudes outside the frame and operates an electric control device. The trigger and the electric control device are connected to the moving gear unit of the moving working component and follow the movements of the component. The trigger and the control device can occupy different relative positions, so that each movement made by the trigger from a neutral position, activates the control device, which in turn starts the electric motor to move the whole unit: i.e. the moving gear unit, the trigger, and the control device which then returns automatically to the neutral position at which the trigger is immobilized either by the limit stops, or manually.

12 Claims, 8 Drawing Sheets

PORTABLE ELECTRIC TOOL

This application is a continuation of application Ser. No. 07/187,176, filed Apr. 28, 1988, now abandoned.

BACKGROUND OF THE INVENTION

The present invention relates to a portable electric tool for on site use; examples of such tools include, for example, shears or secateurs for use in agriculture, arborculture, viticulture or horticulture, for pruning and/or harvesting.

DESCRIPTION OF THE PRIOR ART

Electric secateurs are known from German Utility No. G 86 14 677.7 and French patent application No. 2,584,566 which include a moving blade disposed at the end of a hollow frame. One part of the hollow frame of such secateurs forms the handle of the secateurs and inside the frame are placed an electric motor and a speed reducer. The output shaft of the speed reducer is connected to the moving blade by a transmission system which comprises a moving drive component to enable the blade to move to a closed position. The power supply for such secateurs has a push button control which, when pressed, activates a circuit breaker to the power supply of the motor to bring the moving blade of the secateurs into its closed position. When released, the circuit breaker arrests the motor to cause the blade to return to its open position, usually by means of a spring.

The main disadvantage of this type of electric secateurs is that it is not possible to synchronise the speed and range of movement of the moving blade with the speed and range of movement of the control unit. Thus, depression and release of the push button causes the blades to open and close abruptly, there being little control over the operation.

Apart from the fact that this lack of control is dangerous because of the inherent inability to control the moving blade as it moves towards the fixed blade when the push-button control is depressed, it is, furthermore, a considerable disadvantage in that it is practically impossible to stop the moving blade at a precise intermediary position. As will be appreciated, it is often necessary to regulate the gap between the blades, for example, to cut into vegetation which is relatively dense, to prevent entanglement, or to allow a branch or bough to be cut.

SUMMARY OF THE INVENTION

The present invention sets out to eliminate or at least alleviate these disadvantages and shortcomings.

One object of the invention is to synchronise the speed and range of movement of the moving blade or blades of a tool with the speed and range of movement of the control unit (trigger), thereby enabling the moving blade or blades to be arrested at any intermediary position between the maximum open and closed positions and vice-versa.

According to the present invention in one aspect, there is provided a portable electric tool comprising at least one movable working component a hollow frame which are housed an electric motor and a speed reducer connected through transmission means to the working component of the tool, the tool also including a trigger which extends to a position outside the frame and is movable to operate an electric control device connected to the transmission means whose movements the trigger and control device follow, the arrangement being such that each movement made by the trigger away from a neutral position activates the control device to cause the electric motor to return the transmission means, the trigger and the control device automatically to their neutral positions whereupon the trigger is immobilised.

According to the present invention in another aspect, there is provided a portable electric tool operable by a trigger and including a hollow frame which houses an electric motor connected through speed reduction means and transmission means to a working component of the tool, the tool including a control device operable by the trigger to effect operation of the electric motor to return the transmission means, the trigger and the control device automatically to their neutral positions thereby to immobilise the trigger.

In a further aspect, the invention provides portable electric secateurs in which the trigger of the secateurs and an electric control device activated thereby are connected to the moving drive component of the moving working part of the tool, the movements of which they follow, and can be disposed at different relative positions, so that any movement of the trigger in either direction from any neutral position activates the control device which then starts the electric motor and sets the whole device in motion, i.e. the moving drive component, the trigger and the control unit return automatically to neutral positions when the trigger is immobilised, either manually or by the limit stop.

One advantage of the invention is that the design of the tool is improved, allowing greater precision in controlling and adjusting the speed of closure of the tool blades, directly with the trigger, so that it is possible to keep the blades in any intermediary position between the maximum open and closed positions.

In this way, a tool in accordance with the invention has the power of an electric cutting tool, but which is controlled and operated in the same way as traditional manual secateurs.

Another advantage of the invention is that the tool does not require electric or electronic limit stop systems, which simplifies its assembly and eliminates any jarring caused by such a system during closing or opening of the blades.

Another disadvantage of conventional electric secateurs lies in the fact that the drive system of the moving blade consists of a cogged device which does not allow the blades to be re-opened before they have been completely closed, so that it is very difficult to release the secateurs if the blades are caught around a branch which is too thick for them to cut.

According to the invention, this disadvantage is eliminated by a design in which the moving drive component of the moving working part of the tool is made up of the screw of a ball-screw and nut system connected to the working part, for example, by means of two connection rods.

This characteristic of the invention is advantageous for secateurs used in harvesting and/or pruning work, enabling the production of a high-powered device which is very efficient. The electric motor of the said device can run at high speed (around 7000 rpm). The moving drive component has a slight time delay which gives great variation in speeds and alloWs the direction of rotation of the motor to be changed, thus increasing the degree of automation of the device with only a small increase in the amount of energy consumed. There is also very precise control over the movement of the moving drive component, which gives a perfectly controlled cutting action.

Because of the simplicity of its design, the portable electric tool, according to the invention, is not heavy or bulky.

BRIEF DESCRIPTION OF THE DRAWINGS

The invention will now be described by way of example only with reference to the accompanying drawings in which.

DETAILS AND DESCRIPTION OF THE PREFERRED EMBODIMENTS

Reference is made to the drawings to illustrate one important embodiment, though not a limitative embodiment of a portable electric tool in accordance with the invention.

The invention has application to other portable tools, such as, for example, shears for cutting through the bodywork of cars which have been involved in accidents, and collet chucks and the like which have a workhead with at least one moving working component.

The following example refers to one particular application of the invention, this being secateurs suitable for pruning and/or harvesting work in agriculture, viticulture or horticulture, in which the workhead comprises a cutting tip where the moving working component is one of two cutting blades.

Figure 1:
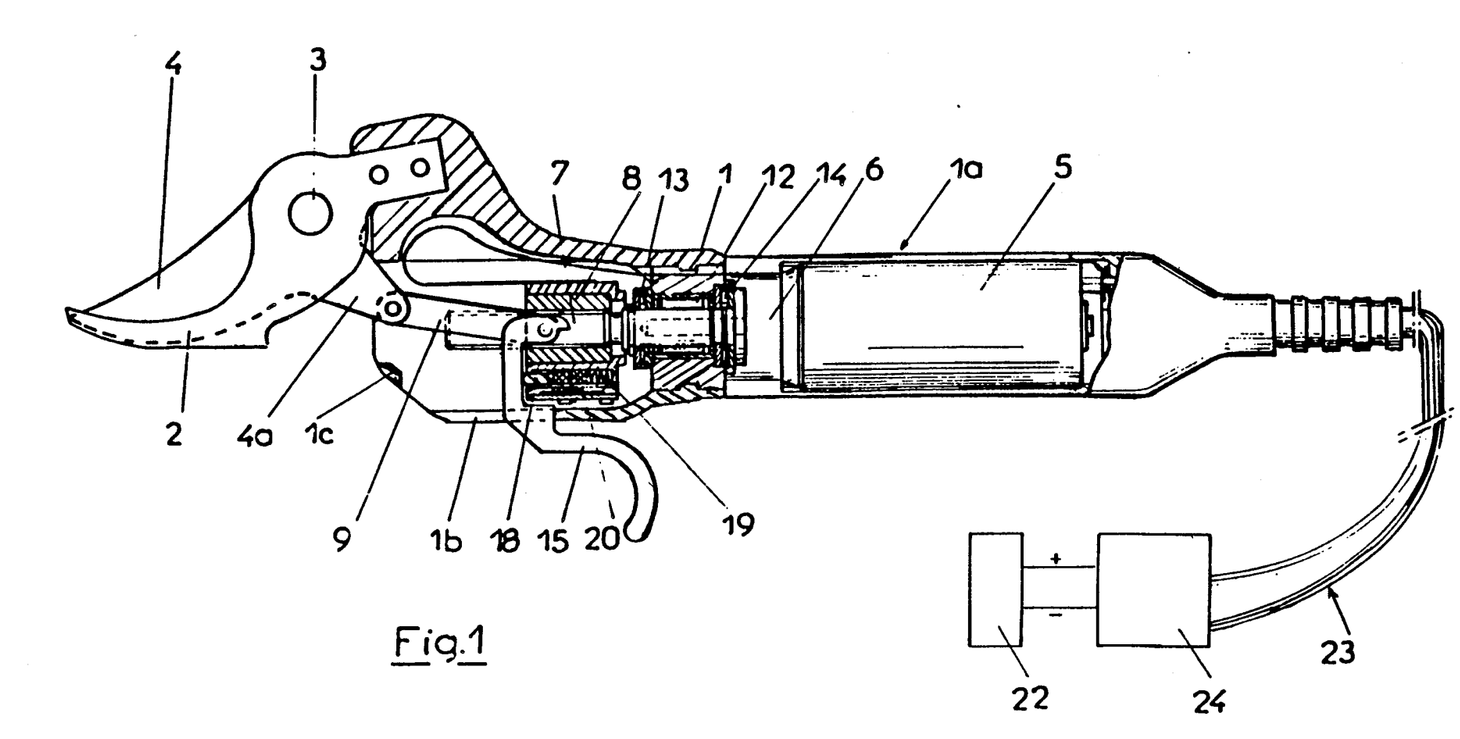
FIG. 1 is a side elevational view partly in section of electric secateurs in accordance with the invention.
Figure 2:
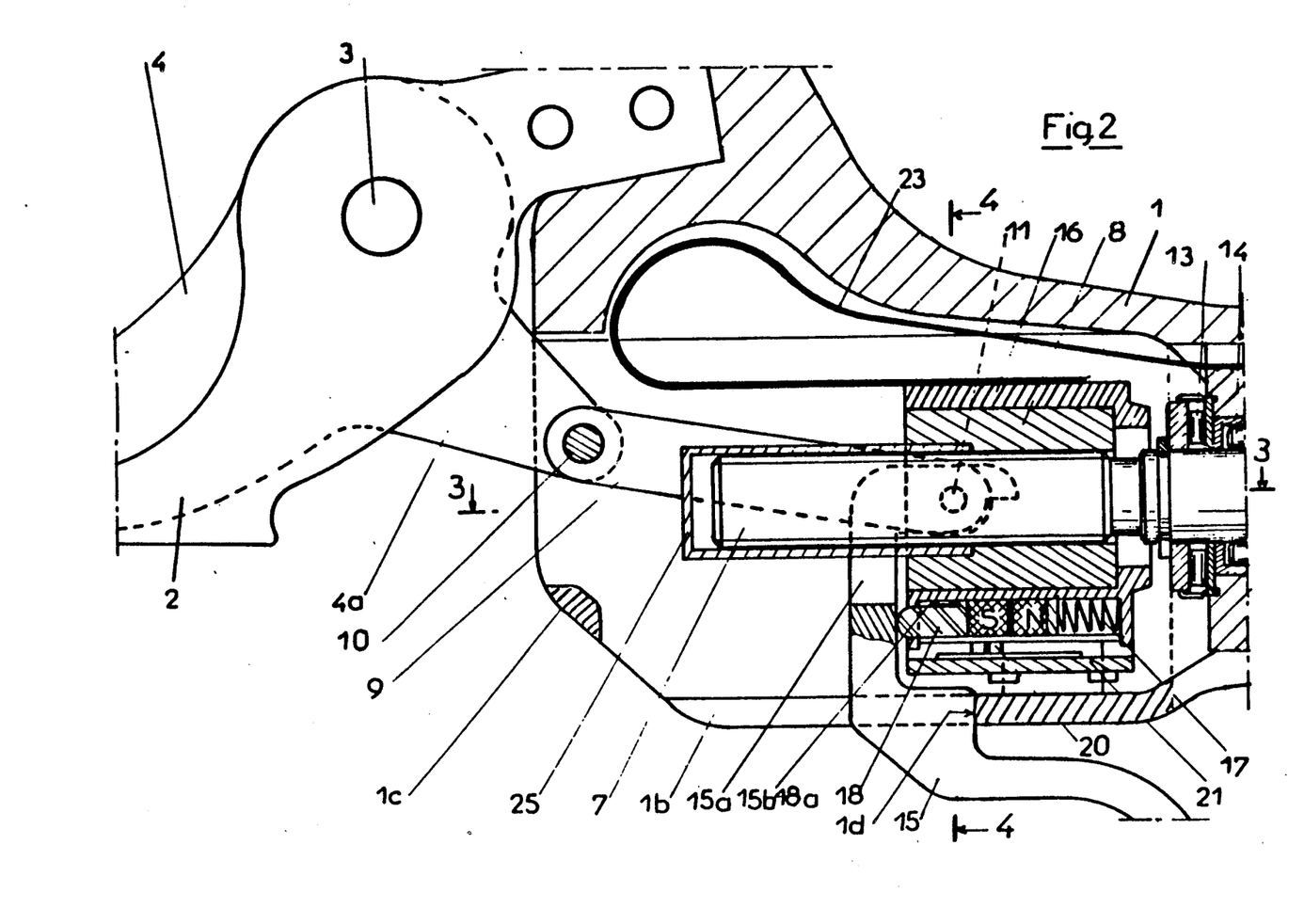
FIG. 2 is a side elevational view in section to an enlarged scale of the front part of the secateurs illustrated in FIG. 1.

The secateurs illustrated comprise a hollow frame 1, the back part 16 of which is formed so as to serve as a handle and on the front part of which is attached a fixed blade or hook 2 of the cutting tool. The frame 1 is constructed, for example, in two parts which are assembled longitudinally by means of a threaded screw. A moving blade 4 is joined to the hook 2 by means of a pin 3.

A direct current electric motor 5 is housed in the rear part 1a of the frame and this is connected to a speed reducer 6 disposed in front of the motor 5.

The output of the reducer is connected to a conventional ball-screw and nut system comprising a screw 7 which rotates, but does not move axially, and a nut 8 which moves axially but does not rotate.

Figure 3:
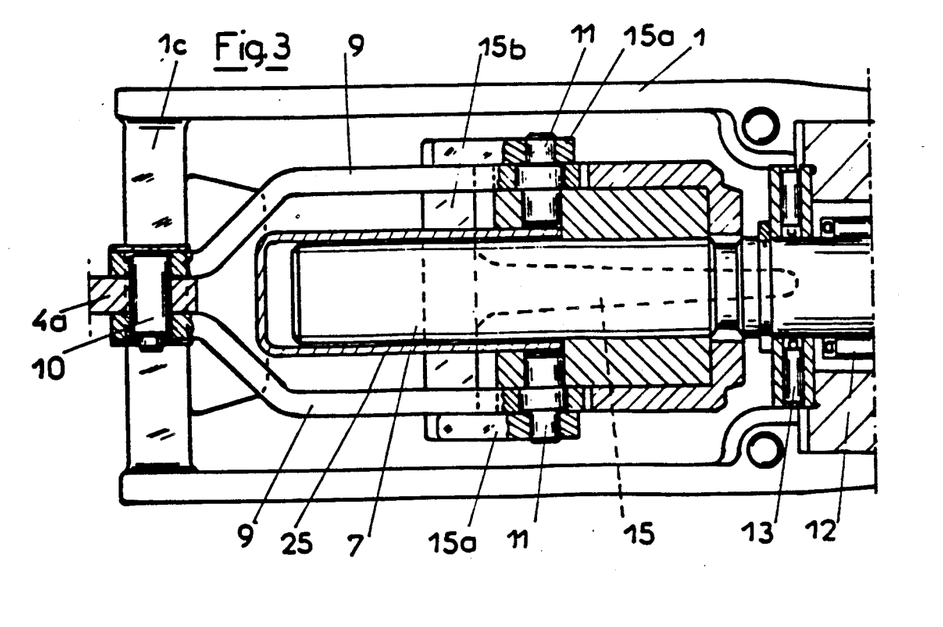
FIG. 3 is a section taken along line 3—3 of FIG. 2.
Figure 4:
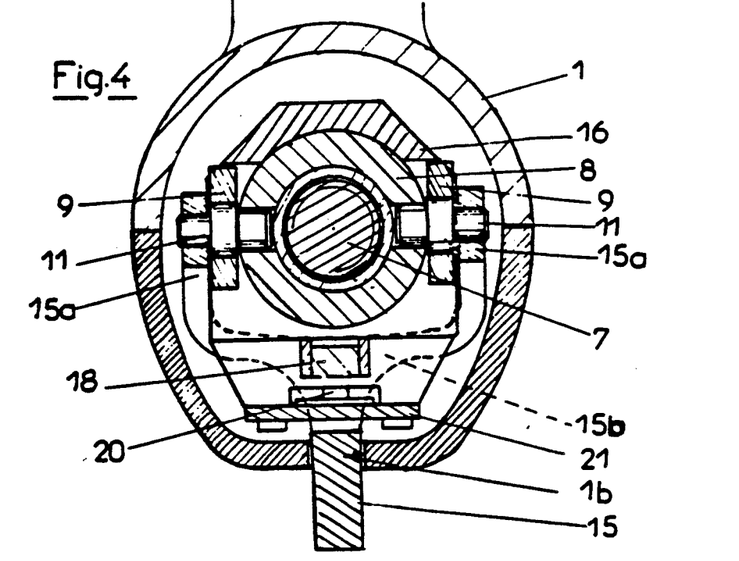
FIG. 4 is a section taken along line 4—4 of FIG. 2.

The rotatable screw 7 is connected to the outlet of the reducer 6, while the axially mobile nut 8 is connected by means of two connecting rods 9 to the moving blade 4. More precisely, these connecting rods are disposed laterally on each side of the nut and are fixed by means of hinge pins 10 and 11 to an extension or arm 4a of the blade 4 and to the nut 8 respectively.

In a preferred embodiment, a device which allows the motor and the reducer to be relieved of parasitic loss due to cutting is disposed around the rear part of the screw 7. This device comprises on one side, a bearing consisting of a needle roller bearing 12 which enables the screw 7 to be realigned and which also takes up some of the radial load which the screw bears. On its other side the device has limit stops, such as, for example, pointer stops 13 and 14 disposed in front and behind the needle roller bearing 12, which take up the radial load when the blades are open and, more importantly, when they are closed.

At the front of the nut 8 is disposed a small tubular casing 25, which covers and protects the rear part of the screw 7.

On the nut 8 is mounted a trigger 15 which controls the opening and closing actions of the blades.

According to the example illustrated, the trigger 15 comprises a forked upper part which comprises two branches 15a by which it is fixed to the hinge pin 11 mounted on the moving nut 8. It also includes a support head 15b positioned where the two branches 15a meet.

The trigger 15 rotates in relation to the moving nut 8, and moves with it in a direction generally parallel to the screw 7.

The front part of the frame 1 has a longitudinal aperture 1b to accommodate one end rotational, axial and translational motions of the trigger. At one end of this aperture is disposed a small cross bar 1c a limit stop for the trigger 15; this bar 1c may be constructed integrally with the frame, or may be welded, screwed or otherwise attached to the frame.

The rear edge 1d of the aperture 1b also defines a limit stop to return movement of the trigger 15 when this is manually operated.

The drawings show fixed limit stops 1c, 1d, but these may also be adjustable by means of a simple mechanical adjustment.

According to the invention, the electric control device activated by the trigger is connected to the moving nut 8 and moves with it.

According to the preferred embodiment shown in the drawings, the nut 8 is mounted in a moving casing 16, the lower part of which is equipped with a chamber 17 which runs parallel to the longitudinal axis of the secateurs. This chamber houses a magnetic control valve 18 and a compression spring 19 which urges the control valve 18 towards the trigger 15 through an aperture positioned in the front well of the chamber. Thus, the emergent end of the control valve 18 is in constant contact with the head 15b of the trigger 15, the trigger 15 being unconnected mechanically to the control valve.

The control valve 18 includes at least one magnet and has a projection 18a which forms a stop to limit movement of the valve towards the trigger.

Figure 9:
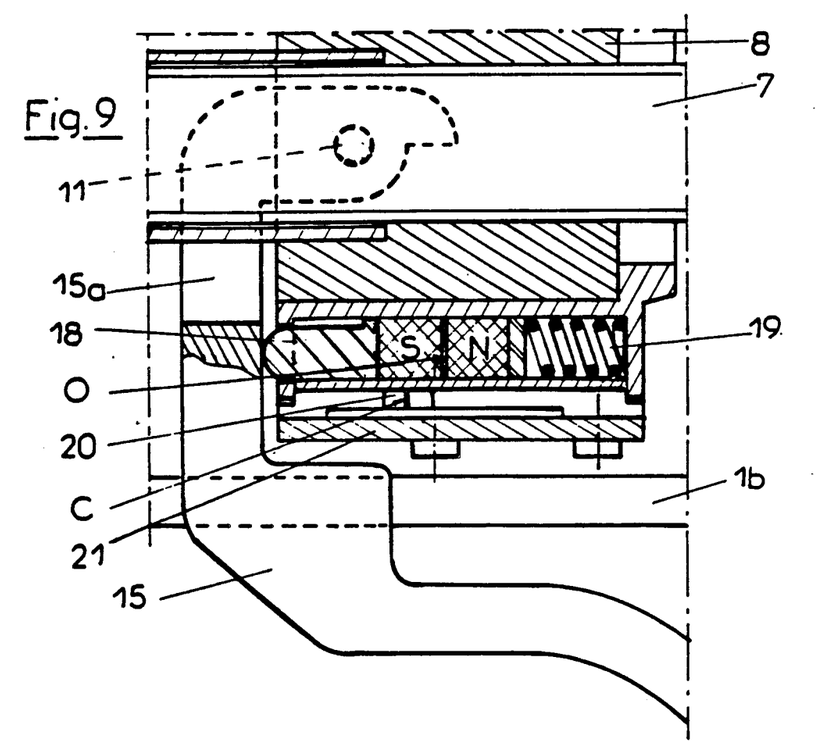
FIGS. 9 and 10 are detailed sections showing the operation of an electric control device of the secateurs illustrated.
Figure 10:
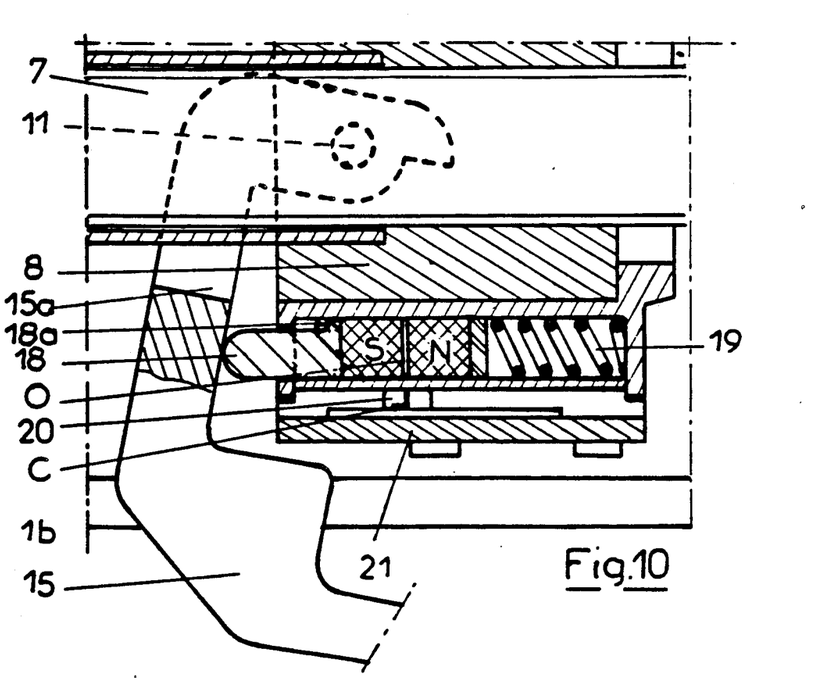

The magnetic valve is equipped with two magnets S, N, inversely positioned, the magnetic fields of which are at right angles to the pick-off described below. In a preferred embodiment, a small space constituting the centre "O" of the magnetic assembly is housed between the two magnets "S", "N", which are placed head to tail.

Below the chamber 17 and the control valve 18 is positioned a pick-off 20, above which the magnets "S", "N", mounted on the valve 18 may move. In a preferred embodiment, the pick-off 20 may be in the form of a Hall effect pick-off, known in the art, allowing the value of the magnetic field to be transformed into proportional potential without physical contact.

It is possible, however, to use other types of pick-off to find the position of the control valve 18 or trigger 15, such as a potentiometric linear pick-off, an optical linear pick-off, a capacitance pick-off, a differential transformer, a piezoelectric stress pick-off or a strain gauge in relation to the arrangement of the electric control device or the trigger.

The pick-off 20 is carried by a plate 21 screwed or otherwise fixed to the casing 16 around the nut 8.

The electric motor of the tool may be supplied by a portable direct current generator. This electric generator consists, for example, of a portable storage battery 22, mounted on a belt or a strap arrangement; using this type of rechargeable battery with a high storage capacity gives greater operational independence.

The battery 22 is connected to the motor 5 by a flexible electric cable 23.

In the circuit supplying the motor is arranged an electronic control card 24 which is also connected to the pick-off 20 by means of a flexible cable. The electronic control card 24 is known in the art and controls the motor 5 in dependence on the position of the trigger 15 and the control valve 18.

Figure 5:
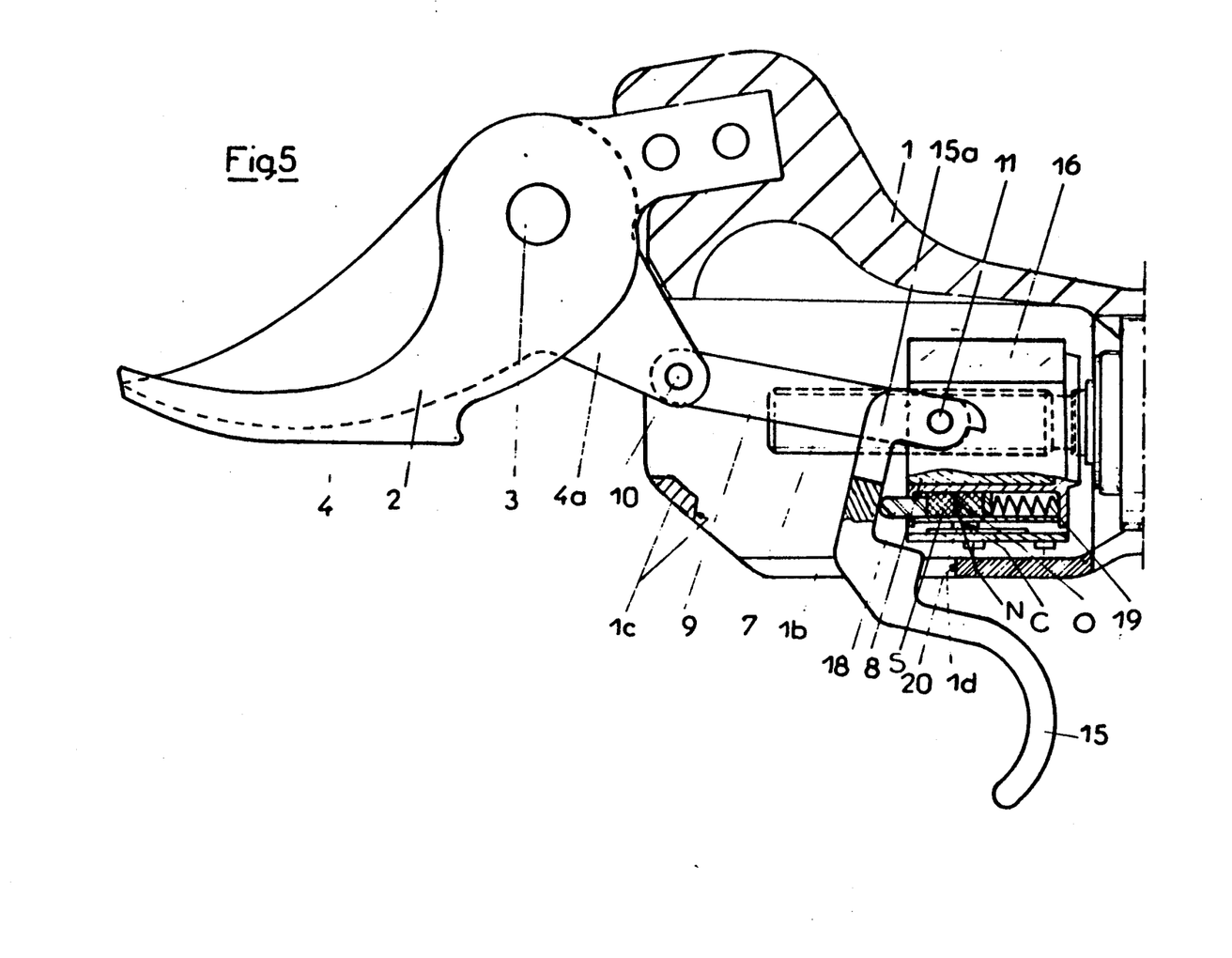
FIG. 5 is a side elevational view partly in section of the front part of the secateurs illustrated in FIG. 1 in a dynamic position, which allows the blades of the secateurs to re-open.

The secateurs described above operate in the following manner:

When not in use, the blades 3, 4 are in the closed position and the driving unit consisting of the nut 8, the trigger 15 and the electric control device 18-20 are in the return position; the trigger swings forward, urged by the action of the spring 19 on the control valve 18, and the "N" pole of the magnet or magnets is disposed opposite the pick-off 20 (FIG. 5). The flow of electric current to the tool is controlled by a safety switch positioned on a box containing the battery or batteries 22.

When the current supply is switched on, the motor 5 starts running and rotates the screw 7, by means of the reducer 6, in such a way that the whole unit comprising the nut 8, trigger 15, and electric control device 18-20 is moved forward until the trigger 15 comes into contact with the front limit stop 1c. The moving blade 4, which is connected to the unit by the rods 9, is then rotated to the open position.

Figure 6:
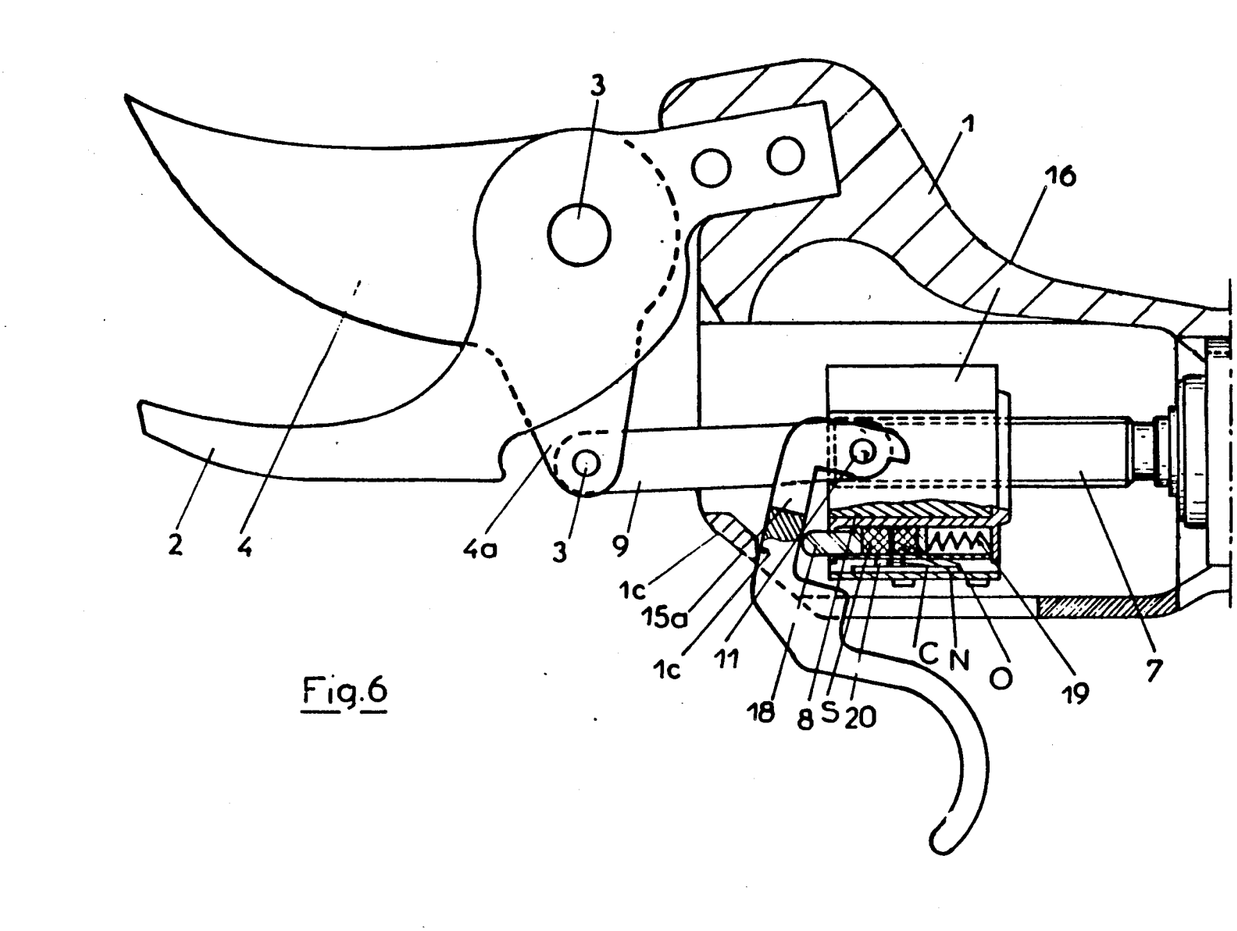
FIG. 6 is a view similar to that shown in FIG. 5, showing the secateurs in a static position where the blades are at the maximum open position.

When movement of the trigger 15 is arrested by the limit stop 1c, the nut 8 continues to move forward to drive the control valve 18 against the trigger. This movement decelerates, then cuts off the motor 5 by means of the pick-off 20 and the electronic card 24 as the centre "O" of the magnet or magnets moves to a position opposite to the centre "C" of the pick-off (FIG. 6). In this position, the blades 2 and 4 of the secateurs are in their maximum open position.

In order to close the blades and operate the cutting action, the trigger 15 is depressed to drive the control valve 18 completely home and move the "S" pole of the magnet or magnets to a position opposite the centre "C" of the pick-off 20.

The motor, controlled by the pick-off and the electronic card begins to run in the reverse direction to rotate the screw 7 in the opposite sense thereby to set the whole unit comprising nut 8, trigger 15, control unit 18-20 in the return movement; the return of the unit rotates the moving blade 4 to its closed position.

Figure 7:
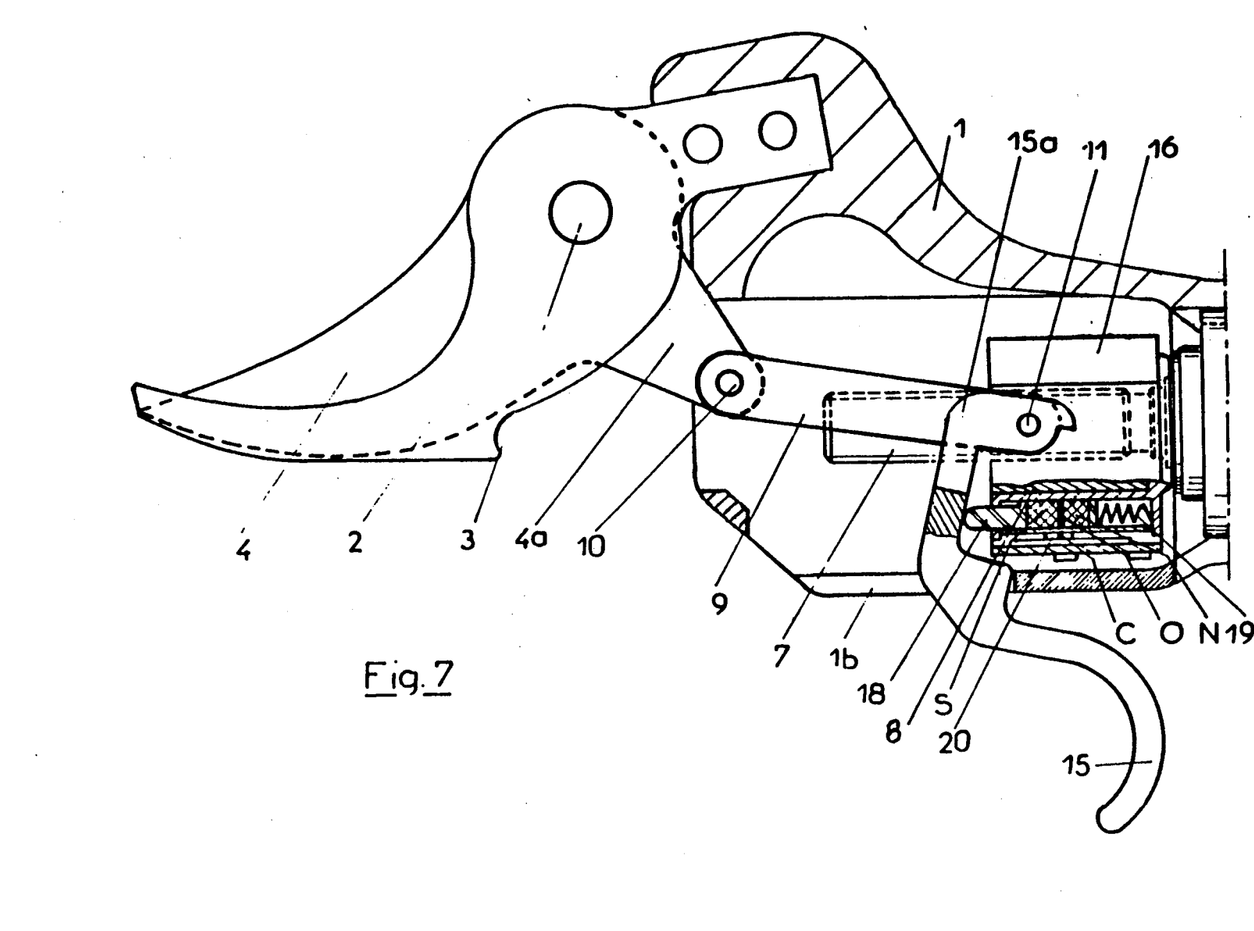
FIG. 7 is a view similar to that shown in FIG. 5, showing the secateurs in a static position in which the blades are closed.

When the trigger 15 comes into contact with the back edge of the aperture a, its movement is arrested, but the nut 8 continues to move backwards to bring the control valve forward, due to the action of the spring 19. This movement decelerates and then cuts off the motor 5 by means of the pick-off 20 and the electronic card 24, when the centre "O" of the magnet or magnets is moved to a position opposite to the centre "C" of the said pick-off. In this position, the blades 2 and 4 of the device are in the fully closed position (FIG. 7).

It can be seen that the cutting tip and the transformation and transmission device are disposed in such a way as to permit wood to be cut by a traction movement.

When the trigger 15 is released, it rotates forward, under the action of the spring 19 transmitted by the control valve 18, and the moving control unit is returned to the position shown in FIG. 5, to enable the blades to be re-opened.

It can be seen that movements of the moving blade 4 are completely controlled by movements of the trigger, thereby ensuring complete progressivity when the secateurs are open and, more importantly, when they are closed and during the cutting action.

The moving blade 4 may be precisely immobilised in any intermediary position required, during either the opening or closing action.

Figure 8:
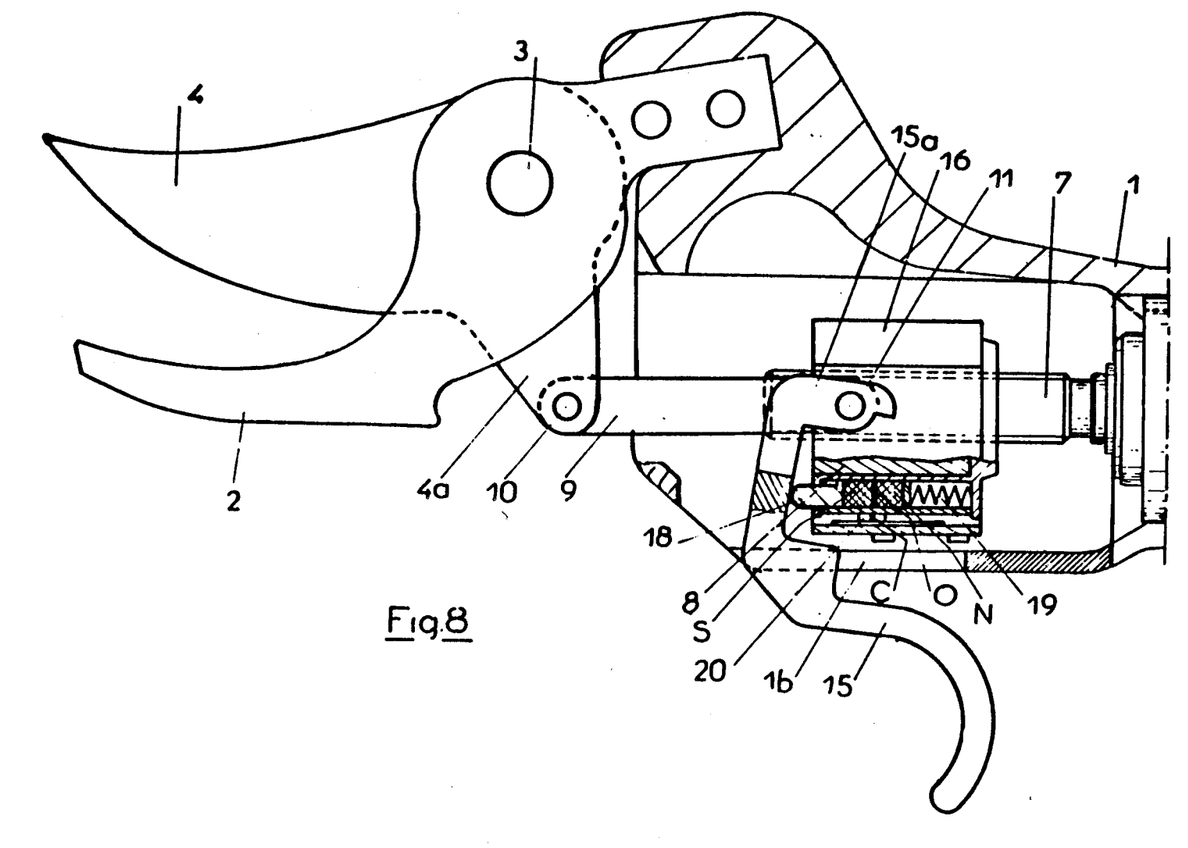
FIG. 8 is a view similar to that shown in FIG. 5, with one blade maintained at an intermediary position.

In order to achieve this, the trigger 15 must be immobilised manually in an intermediary position (FIG. 9). In this position, the nut 8 continues to move either forward or backward, to return or drive home the control valve 18 resting against the trigger. This movement of the valve 18 firstly decelerates and this cuts off the motor 5 by means of the pick-off 20 and the electronic card 24, when the centre "O" of the magnet or magnets is opposite the centre "C" of the pick-off (FIG. 10). When the motor is cut off, the moving blade 4 is immobilised in an intermediary position, which is dependent on the position in which the trigger is immobilised (FIGS. 8 and 10).

If, after the blade 4 has been immobilised, the trigger 15 is depressed again, the whole unit comprising the nut 8, trigger 15, electric control device 18-20 moves backwards, whereas if the trigger is released the said unit moves forwards.

The electronic card 24 which controls the motor, ensures that the rotational speed is proportional to the spaces recorded between the centres "O" and "C" of the magnets and the pick-off 20 respectively, in either direction. Variations in these spaces are translated into acceleration (when the space increases) and deceleration or braking (when the space decreases) of the said motor. These successive stops and starts do not, however, cause any unpleasant jarring.

The variations in spaces are translated into variations in the magnetic field and, therefore, into variations in potential at the head of the Hall effect pick-off: these are then dealt with by the electronic card and transformed into accelerations or decelerations. The electronic card also protects the motor by controlling the maximum level of electric power entering the motor and limiting it to a predetermined level.

This method of controlling the motor ensures that the moving working component of the tool is perfectly controlled by the trigger.

It should be stressed that, although the drawings show secateurs with a single moving blade, the invention may also be applied to tools with two cutting blades, or other moving working components, by a simple adjustment of the workhead of these tools.

The device to be used on side can also be used in combination with other conventional systems of motion transmission or transformation, such as gearing, crank, cam or other systems.

What is claimed is:

1. A portable electric tool operable by a trigger and including a hollow frame which houses an electric motor connected through speed reduction means and transmission means to a working component of the tool, the tool including an electric device operable by the trigger to effect operation of the electric motor to return the transmission means, and the control device automatically to neutral positions thereby to immobilize the trigger.

2. A portable electric tool comprising at least one movable working component, a hollow frame which houses an electric motor and a speed reducer connected through transmission means to the working component of the tool, the tool also including a trigger which extends to a position outside the frame and is movable to operate an electric control device connected to the transmission means, the arrangement being such that each movement made by the trigger away from a neutral position activates the control device to cause the electric motor to move the transmission means, and the control device automatically to neutral positions whereupon the trigger is immobilized.

3. A portable electric tool as claimed in claim 1 wherein the transmission means of the working component of the tool comprises a ball-screw and nut system connected to the working component through at least one connecting rod.

4. A portable electric tool as claimed in claim 2 or claim 3, wherein the tool is provided with limit stops which limit movement of the trigger.

5. A portable electric tool as claimed in claim 4, wherein the limit stops are formed at the front and rear edges of an aperture within which the trigger moves.

6. A portable electric tool as claimed in claim 2 wherein the control device comprises a moving magnetic control valve activated by the trigger and a pick-off positioned adjacent the magnetic valve.

7. A portable electric tool as claimed in claim 6 wherein the magnetic control valve includes at least one magnet so positioned that its magnetic field is at right angles to the pick-off.

8. A portable electric tool as claimed in claim 6, wherein the pick-off is a Hall effect pick-off.

9. A portable electric tool as claimed in claim 6, wherein the magnetic control valve is housed in a chamber which extends in a direction generally parallel to the axis of a rotating screw of a ball-screw and nut system, the chamber including an aperture to allow one end of the magnetic control valve to pass therethrough.

10. A portable electric tool as claimed in claim 9, wherein the magnetic control valve is acted upon by a compression spring which urges the valve towards the trigger.

11. A portable electric tool as claimed in claim 9, wherein a bearing is positioned about the rear portion of the screw of the ball-screw and nut system.

12. A portable electric tool as claimed in claim 3, wherein the tool is provided with limit stops positioned near an end of a screw of the ball-screw and nut system.

* * * * *

UNITED STATES PATENT AND TRADEMARK OFFICE
CERTIFICATE OF CORRECTION

PATENT NO. : 5,002,135
DATED : March 26, 1991
INVENTOR(S) : Roger Joseph Pierre Pellenc It is certified that error appears in the above-indentified patent and that said Letters Patent is hereby corrected as shown below:

Column 7, line 5, claim 1, change "electric device" to read --electric control device --.

Signed and Sealed this

Twenty-eighth Day of September, 1993

Attest:

BRUCE LEHMAN

Attesting Officer

Commissioner of Patents and Trademarks